United States Patent
Yonezawa et al.

(10) Patent No.: US 9,031,371 B2
(45) Date of Patent: *May 12, 2015

(54) MULTI-MODE OPTICAL FIBER (75) Inventors: Kazuhiro Yonezawa, Yokohama (JP);
Sumio Hoshino, Yokohama (JP)

(73) Assignee: Sumitomo Electric Industries, Ltd.,
Osaka-shi, Osaka (JP)

( * ) Notice: Subject to any disclaimer, the term of this patent is extended or adjusted under 35 U.S.C. 154(b) by 456 days.

This patent is subject to a terminal disclaimer.

(21) Appl. No.: 13/466,414

(22) Filed: May 8, 2012

(65) Prior Publication Data

US 2013/0302000 A1   Nov. 14, 2013

(51) Int. Cl.
*G02B 6/028* (2006.01)
*G02B 6/036* (2006.01)

(52) U.S. Cl.
CPC .......... *G02B 6/0281* (2013.01); *G02B 6/03694* (2013.01); *G02B 6/03627* (2013.01)

(58) Field of Classification Search
None
See application file for complete search history.

(56) References Cited

U.S. PATENT DOCUMENTS

| 5,033,815 | A  | * | 7/1991  | Edahiro et al. | 385/142 |
| 7,231,121 | B2 |   | 6/2007  | Park et al. |  |
| 8,565,566 | B2 | * | 10/2013 | Hoshino et al. | 385/124 |
| 8,565,567 | B2 | * | 10/2013 | Hoshino et al. | 385/124 |
| 8,798,420 | B2 | * | 8/2014  | Yonezawa et al. | 385/123 |
| 2003/0101774 | A1 | * | 6/2003 | Oh et al. | 65/488 |
| 2003/0138229 | A1 | * | 7/2003 | Paek et al. | 385/123 |
| 2004/0240814 | A1 | * | 12/2004 | Boek et al. | 385/123 |
| 2008/0166094 | A1 | * | 7/2008 | Bookbinder et al. | 385/124 |

FOREIGN PATENT DOCUMENTS

| JP | 2003-315184 |   | 11/2003 |
| JP | 2006-58494  |   | 3/2006  |
| JP | 2007-197273 |   | 8/2007  |
| JP | 2007197273  | A * | 8/2007 |
| JP | 2011-10296  |   | 1/2011  |

* cited by examiner

*Primary Examiner* — Michelle R Connelly
(74) *Attorney, Agent, or Firm* — Drinker Biddle & Reath LLP (57) ABSTRACT

The present invention relates to a GI-type multi-mode optical fiber in which the outer diameter of the core is 47.5 to 52.5 μm or 60 to 65 μm, or to a bend resistant multi-mode optical fiber provided with resistance against property fluctuation caused by the bending of the multi-mode optical fiber by providing a trench portion having a low refractive index at the outer periphery of the core. In the multi-mode optical fiber, both the maximum tensile stress and the maximum compressive stress in the optical axis direction remaining in the core are 50 MPa or less.

11 Claims, 7 Drawing Sheets

| RESIDUAL STRESS IN CORE (MPa) | minEMBc (850nm) | TRANSMISSION CHARACTERISTICS OF MULTI-MODE FIBER (MHz·km) | |
|---|---|---|---|
| | | OFL BANDWIDTH (850nm) | OFL BANDWIDTH (1300nm) |
| 7.4 | 6590 | 5916 | 695 |
| 0.0 | 8850 | 7235 | 707 |
| -18.9 | 4852 | 4018 | 530 |
| -44.0 | 3340 | 3429 | 573 |
| -69.8 | 2861 | 3110 | 487 |

MULTI-MODE OPTICAL FIBER

BACKGROUND OF THE INVENTION

1. Field of the Invention

The present invention relates to a multi-mode optical fiber.

2. Related Background Art

It is known that a multi-mode optical fiber structurally has greater transmission loss in comparison to a single mode optical fiber for use in long-haul optical communication. Meanwhile, a multi-mode optical fiber is broadly used in short-haul information communication, in a LAN (Local Area Network) for example, because fiber-to-fiber connection is easy since connection loss is small, and a network can be built easily using equipment with a low required performance.

In recent years, aiming to achieve the high-speed transmission in the short-haul information communication, technologies for reducing the transmission loss of multi-mode optical fibers and expanding the communication band (achieving a wider bandwidth) are being actively researched.

SUMMARY OF THE INVENTION

The present inventors conducted the following study for achieving technology to stably manufacture a multi-mode optical fiber which is suitable for high-speed transmission in order to realize even faster short-haul information communication. Note that, in the present specification, the term "optical fiber" which is used without any specific reference shall mean a "multi-mode optical fiber."

In order to stably manufacture a multi-mode optical fiber which is suitable for high-speed transmission, the refractive index profile in the diametric direction thereof needs to accurately coincide with the intended shape. In order to achieve the intended shape of the refractive index profile, to begin with, $GeO_2$ needs to be added in the diametric direction of the core at an accurate concentration, but such an addition alone is not necessarily sufficient. For example, in an optical fiber that is obtained after drawing a preform, the refractive index profile thereof will slightly change even due to the influence of the residual stress in that optical fiber. In this case, what is important in the manufacture of an optical fiber is how to reduce the influence of the residual stress on the refractive index fluctuation, or how to constantly maintain the same profile. Note that, conventionally, the manufacturing stability was never confirmed from the perspective of residual stress in the manufacture of a multi-mode optical fiber.

Meanwhile, in recent years, there are demands for faster short-haul information communication in datacenters using multi-mode optical fibers, and in particular it is now known that the control of residual stress is also extremely important upon manufacturing optical fibers that satisfy the OM3 standard or the OM4 standard of ISO/IEC11801.

The present invention has been developed to eliminate the problems described above. It is an object of the present invention to provide a multi-mode optical fiber comprising a structure which can be stably manufactured while ensuring high-speed transmission.

By way of reference, a multi-mode optical fiber which satisfies the OM3 standard refers to an optical fiber in which a bandwidth referred to as the Minimum Effective Modal Bandwidth (minEMB) is 2000 MHz·km or more at 850 nm, and the bandwidth of the overfilled launch (OFL bandwidth stipulated in the international standard IEC60793-1-41) is 1500 MHz·km or more at 850 nm, and 500 MHz·km or more at 1300 nm. In the present specification, the minimum value of the Calculated Effective Modal Bandwidth is represented as "minEMBc." Note that, in the OM3 standard, a multi-mode optical fiber needs to satisfy the following three conditions (OM3-1 to OM3-3).

$$\text{minEMBc}(850 \text{ nm}) \geq 2000 \text{ MHz·km} \quad (OM3\text{-}1)$$

$$\text{OFL bandwidth}(850 \text{ nm}) \geq 1500 \text{ MHz·km} \quad (OM3\text{-}2)$$

$$\text{OFL bandwidth}(1300 \text{ nm}) \geq 500 \text{ MHz·km} \quad (OM3\text{-}3)$$

Moreover, in the OM4 standard, a multi-mode optical fiber needs to satisfy the following three conditions (OM4-1 to OM4-3).

$$\text{minEMBc}(850 \text{ nm}) \geq 4700 \text{ MHz·km} \quad (OM4\text{-}1)$$

$$\text{OFL bandwidth}(850 \text{ nm}) \geq 3500 \text{ MHz·km} \quad (OM4\text{-}2)$$

$$\text{OFL bandwidth}(1300 \text{ nm}) \geq 500 \text{ MHz·km} \quad (OM4\text{-}3)$$

The present invention relates to a GI (Graded Index)-type multi-mode optical fiber which satisfies the OM3 standard and/or the OM4 standard required for realizing ultrahigh-speed communication, and this multi-mode optical fiber is clearly differentiated from a single mode optical fiber for use in long-haul transmission in terms of structure. In particular, the multi-mode optical fiber according to the present invention includes a bend resistant multi-mode optical fiber which has resistance against the fluctuation of transmission characteristics caused by the bending of the optical fiber and which is obtained by additionally providing a trench portion having a low refractive index to the GI-type multi-mode optical fiber. Thus, in the present specification, a GI-type multi-mode optical fiber having a standard structure configured from a core and a cladding is simply referred to as a GI-type multi-mode optical fiber, and a GI-type multi-mode optical fiber in which a trench portion is provided between a core and a cladding is referred to as a BI-type multi-mode optical fiber. Moreover, in the present specification, the term "multi-mode optical fiber" used without any prefix shall mean both the GI-type and the BI-type multi-mode optical fibers.

In particular, the multi-mode optical fiber according to the present invention comprises, as a GI-type multi-mode optical fiber, a core extending along an optical axis direction and doped with $GeO_2$ (germanium dioxide), and a cladding provided to an outer periphery of the core and having a refractive index lower than that of the core. Moreover, the multi-mode optical fiber according to the present invention comprises, as a BI-type multi-mode optical fiber, a core extending along an optical axis direction and doped with $GeO_2$ (germanium dioxide), a trench portion provided to an outer periphery of the core and having a refractive index lower than that of the core, and a cladding provided to an outer periphery of the trench portion and having a refractive index lower than that of the core but higher than that of the trench portion.

Regarding the multi-mode optical fiber of either GI-type or BI-type according to the present invention, a refractive index profile in a diametric direction of the multi-mode optical fiber, an α value of a portion corresponding to the core is 1.9 to 2.2, and a diameter $2a$ of the core is 47.5 to 52.5 μm or 60 to 65 μm. Moreover, preferably, a relative refractive index difference Δ of the center of the core (maximum relative refractive index difference of the core) with respect to the reference region of cladding is 0.8 to 2.4%. Note that, when the cladding is configured from a plurality of regions, the region that is positioned outermost is defined as the reference region.

Moreover, both the maximum tensile stress and the maximum compressive stress in the optical axis direction remaining in the core are preferably 50 MPa or less in both the GI-type and the BI-type multi-mode optical fibers. In this case, it is possible to stably manufacture a multi-mode optical fiber which satisfies the OM3 standard or the OM4 standard of ISO/IEC11801. Moreover, the refractive index needs to be controlled with ultrahigh precision in order to realize a multi-mode optical fiber which satisfies the OM3 standard and/or the OM4 standard required for realizing ultrahigh-speed communication, and the control of residual stress considerably affects the production yield of the multi-mode optical fiber which satisfies the OM3 standard and/or the OM4 standard.

Note that, generally speaking, the stress remaining in the optical fiber changes keenly based on the configuration, conditions and the like of the drawing apparatus (manufacturing apparatus of optical fibers). Thus, for instance, by intentionally changing the glass tension during the drawing process, the stress (tensile stress or compressive stress) in the optical axis direction remaining at the center portion of the optical fiber obtained after the drawing can be easily adjusted.

In both the GI-type and the BI-type multi-mode optical fibers, both the maximum tensile stress and the maximum compressive stress may be 30 MPa or less, and more preferably both the maximum tensile stress and the maximum compressive stress are 20 MPa or less.

In a multi-mode optical fiber (after drawing) in which residual stress of 30 MPa remains relative to the predicted minEMBc (predicted value) in a preform before drawing, the actual minEMBc (measured value of the actually manufactured multi-mode optical fiber) will decrease by half. Accordingly, upon manufacturing a multi-mode optical fiber which satisfies both the OM3 standard and the OM4 standard, preferably, the residual stress of the core is at least 30 MPa or less.

Moreover, even with a preform in which the predicted minEMBc is 8850 MHz·km, when residual stress of 20 MPa remains in the actually manufactured multi-mode optical fiber, the actual minEMBc of that multi-mode optical fiber will fall below the OM4 standard (minEMBc (850 nm)≥4700). In this case, since it will become difficult to manufacture a multi-mode optical fiber which satisfies the OM4 standard, the residual stress of the core is preferably 20 MPa or less in order to obtain a multi-mode optical fiber which satisfies the OM4 standard.

Note that the multi-mode optical fiber according to the present invention also satisfies the OM3 standard and/or the OM4 standard of ISO/IEC11801.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

In the following, embodiments of the multi-mode optical fiber according to the present invention are now explained in detail with reference to FIGS. 1A to 3C, and 4 to 7. In the description of the drawings, identical or corresponding components are designated by the same reference numerals, and overlapping description is omitted.

Figure 1A:
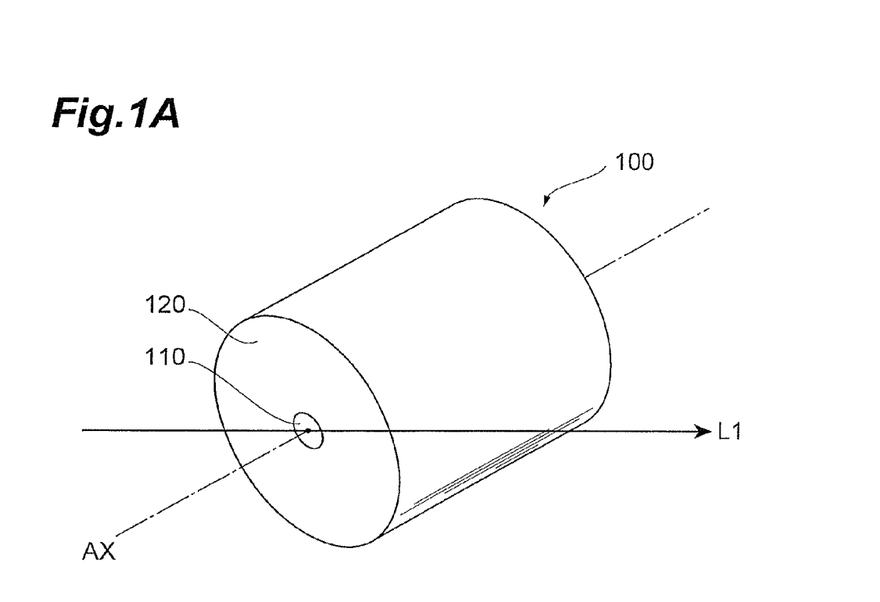
FIG. 1A is a view showing a representative cross section structure of the preform for obtaining the GI-type multi-mode optical fiber as one example of the multi-mode optical fiber according to the present invention.
Figure 1B:
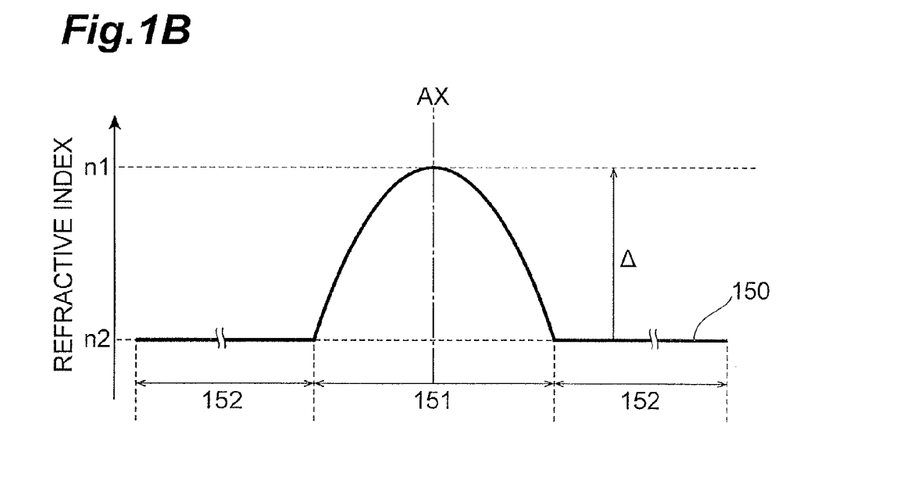
FIG. 1B is a view showing the refractive index profile thereof.

FIG. 1A is a view showing a representative cross section structure of the preform (hereinafter referred to as the "GI-type preform") for obtaining the GI-type multi-mode optical fiber as one example of the multi-mode optical fiber according to the present invention, and FIG. 1B is a view showing the refractive index profile thereof. Moreover, FIG. 3B is a view showing a representative cross section structure of the GI-type multi-mode optical fiber obtained with the drawing apparatus 300 shown in FIG. 3A. The GI-type preform 100 shown in FIG. 1A is mainly composed of silica glass, and comprises a first region 110 extending along an optical axis AX, and a second region 120 provided on the outer periphery of the first region 110. The GI-type multi-mode optical fiber 500A shown in FIG. 3B comprises a core 510A having a diameter 2a and extending along an optical axis direction (AX indicates the optical axis), and a cladding 520A provided on the outer periphery of the core 510A, wherein the core 510A corresponds to the first region 110, and the cladding 520A (a single layer in the example of FIG. 1A and which is used as the reference region for defining the relative refractive index difference) corresponds to the second region 120. In the GI-type preform 100 shown in FIG. 1A, the first region 110 corresponding to the core 510A is doped with $GeO_2$ for adjusting the shape of the refractive index profile, and has a maximum refractive index n1. The second region 120 corresponding to the cladding 520A is a glass region composed of pure silica or doped with an impurity for adjusting the refractive index, and has a refractive index n2 lower than that of the first region 110. As a result of drawing the GI-type preform 100 so that the outer diameter of the cladding 520A exhibits a predetermined value, the GI-type multi-mode optical fiber 500A shown in FIG. 3B can be obtained.

In addition, the GI-type preform 100 has a refractive index profile 150 shown in FIG. 1B. The refractive index profile 150 shown in FIG. 1B indicates the refractive index of the respective parts on a line L1 (coincides with the diametric direction of the GI-type preform 100) that is orthogonal to the optical axis AX in FIG. 1A, and more specifically a region 151 indicates the refractive index of the respective parts of the first region 110 along the line L1 (region to become the core 510A after the drawing), and a region 152 indicates the refractive index of the respective parts of the second region 120 along the line L1 (region to become the cladding 520A after the drawing), respectively.

In particular, the region 151 in the refractive index profile 150 of FIG. 1B has a dome shape so that the refractive index becomes maximum at the center of the first region 110 which coincides with the optical axis AX. Accordingly, the concentration of $GeO_2$ added for adjusting the refractive index also decreases sharply from the center of the first region 110 toward the second region 120. The $\alpha$ value for defining this dome shape is 1.9 to 2.2. The relative refractive index difference $\Delta$ (corresponds to the maximum relative refractive index difference of the core 510A with respect to the cladding 520A) of the center of the first region 110 with respect to the second region (a single layer in the example of FIG. 1A and which is used as the reference region for defining the relative refractive index difference) 120 is 0.8 to 2.4%. Note that the diameter 2$a$ of the core 510A in the obtained GI-type multi-mode optical fiber 500A is 47.5 to 52.5 μm or 60 to 65 μm (refer to FIG. 3B).

By way of reference, when a GI-type preform 100 is manufactured with the maximum relative refractive index difference $\Delta$ of the first region 110 with respect to the second region 120 as 1.17% and the $\alpha$ value as 2.10, and an ideal GI-type multi-mode optical fiber 500A is obtained by using the GI-type preform 100 in a state where the refractive index profile 150 shown in FIG. 1B is completely maintained (that is, the residual stress in the core 510A is 0), the transmission characteristics of such ideal GI-type multi-mode optical fiber 500A will be as follows.

minEMBc(850 nm)=8850 MHz·km

OFL bandwidth(850 nm)=7235 MHz·km

OFL bandwidth(1300 nm)=707 MHz·km

Figure 2A:
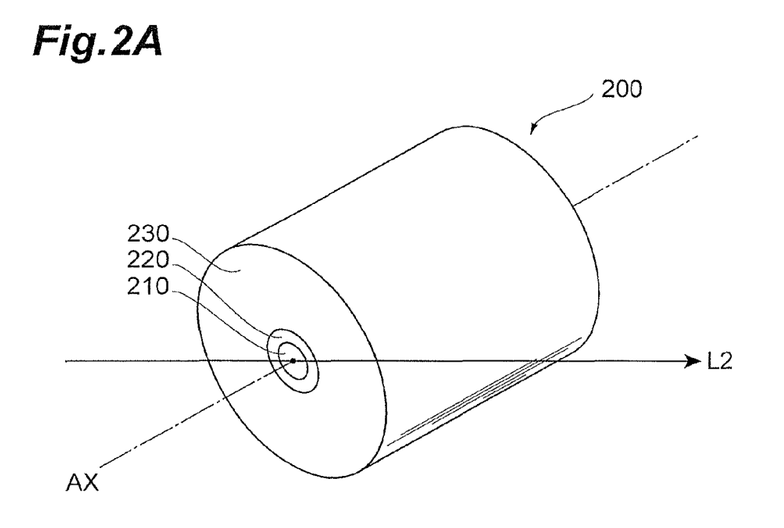
FIG. 2A is a view showing a representative cross section structure of the preform for obtaining the BI-type multi-mode optical fiber (that includes a structure of a GI-type multi-mode optical fiber) as another example of the multi-mode optical fiber according to the present invention.
Figure 2B:
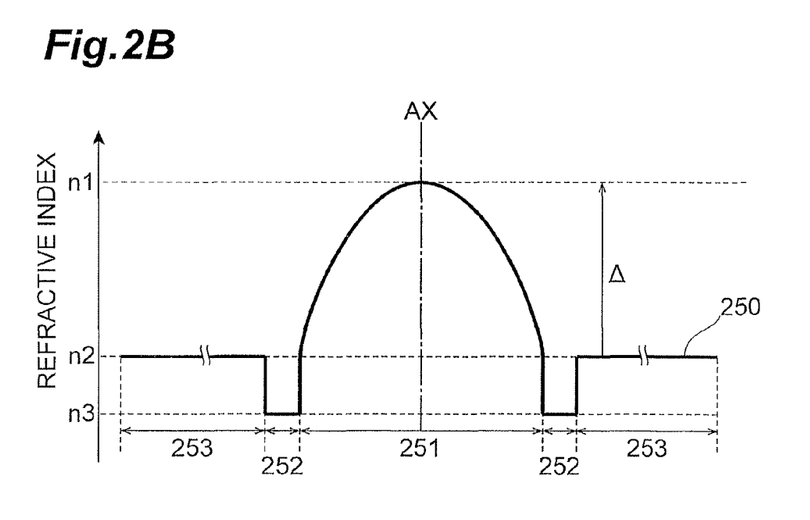
FIG. 2B is a view showing the refractive index profile thereof.

Next, FIG. 2A is a view showing a representative cross section structure of the preform (hereinafter referred to as the "BI-type preform") for obtaining the BI-type multi-mode optical fiber as another example of the multi-mode optical fiber according to the present invention, and FIG. 2B is a view showing the refractive index profile thereof. Moreover, FIG. 3C is a view showing a representative cross section structure of the BI-type multi-mode optical fiber obtained with the drawing apparatus shown in FIG. 3A. The BI-type preform 200 shown in FIG. 2A is mainly composed of silica glass, and comprises a first region 210 extending along an optical axis AX, a second region 220 of a low refractive index provided on the outer periphery of the first region 210, and a third region 230 provided on the outer periphery of the second region 220. The BI-type multi-mode optical fiber 500B shown in FIG. 3C comprises a core 510B extending along an optical axis direction (AX indicates the optical axis), a trench portion 520B provided on the outer periphery of the core 510B, and a cladding 530B provided on the outer periphery of the trench portion 520B, wherein the core 510B corresponds to the first region 210, the trench portion 520B corresponds to the second region 220, and the cladding 530B (which is also a single layer in the example of FIG. 2A and used as the reference region for defining the relative refractive index difference) corresponds to the third region 230. Note that, in the BI-type preform 200 shown in FIG. 2A, the first region 210 corresponding to the core 510B is doped with $GeO_2$ for adjusting the shape of the refractive index profile, and has a maximum refractive index n1. The second region 220 corresponding to the trench portion 520B is a region doped with a refractive index lowering agent such as fluorine for providing bending resistance to the obtained BI-type multi-mode optical fiber 500B, and has a refractive index n3 (<n2<n1). The third region 230 corresponding to the cladding 530B is a glass region composed of pure silica or doped with an impurity for adjusting the refractive index, and has a refractive index n2 (<n1, >n3) lower than that of the first region 210 but higher than that of the second region 220. Note that the BI-type multi-mode optical fiber 500B shown in FIG. 3C can be obtained as a result of the GI-type preform 200 being drawn so that the outer diameter of the cladding 530B becomes a predetermined value.

Meanwhile, the BI-type preform 200 has a refractive index profile 250 shown in FIG. 2B. Note that the refractive index profile 250 shown in FIG. 2B indicates the refractive index of the respective parts on a line L2 (coincides with the diametric direction of the BI-type preform 200) that is orthogonal to the optical axis AX in FIG. 2A, and more specifically a region 251 indicates the refractive index of the respective parts of the first region 210 along the line L2 (region to become the core 510B after the drawing), a region 252 indicates the refractive index of the respective parts of the second region 220 along the line L2 (region to become the trench portion 520B after the drawing), and a region 253 indicates the refractive index of the respective parts of the third region 230 along the line L2 (region to become the cladding 530B after the drawing).

Particularly, the region 251 in the refractive index profile 250 of FIG. 2B has a dome shape so that the refractive index becomes maximum at the center of the first region 210 which coincides with the optical axis AX. Accordingly, the concentration of $GeO_2$ added for adjusting the refractive index also decreases sharply from the center of the first region 210 toward the second region 220 and the third region 230. The $\alpha$ value for defining this dome shape is 1.9 to 2.2. The relative refractive index difference $\Delta$ (corresponds to the maximum relative refractive index difference of the core 510B with respect to the cladding 530B) of the center of the first region 210 relative to the third region (which is a single layer in an example of FIG. 2A and used as the reference region for defining the relative refractive index difference) 230 is 0.8 to 2.4%. Note that the diameter 2$a$ of the core 510B in the obtained BI-type multi-mode optical fiber 500B is 47.5 to 52.5 μm or 60 to 65 μm (refer to FIG. 3C).

Figure 3A:
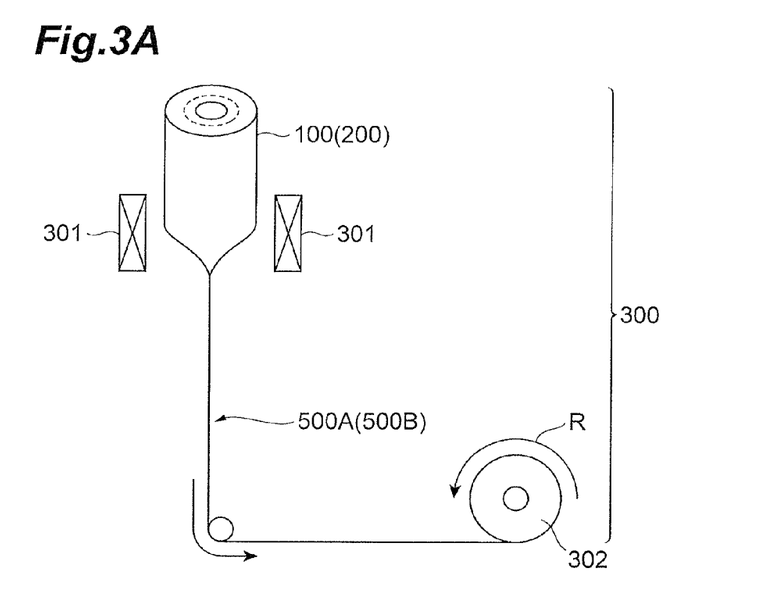
FIG. 3A is a view showing the schematic structure of the drawing apparatus for obtaining the multi-mode optical fiber.
Figure 3B:
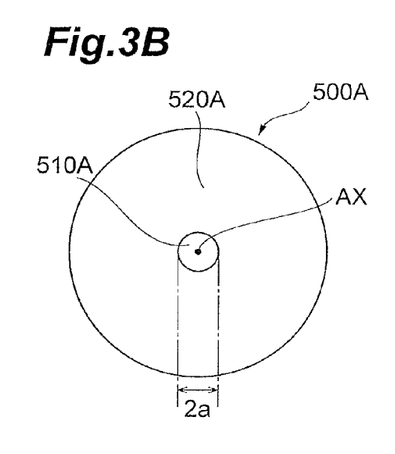
FIG. 3B shows a representative cross section structure of the obtained GI-type multi-mode optical fiber.
Figure 3C:
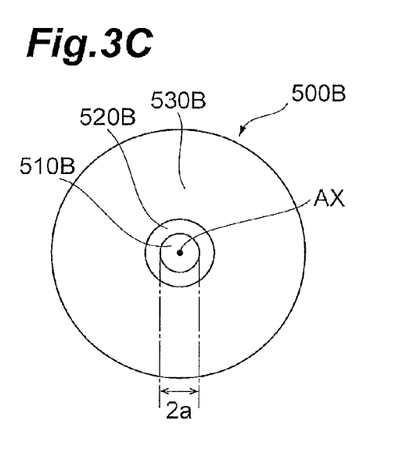
FIG. 3C shows a representative cross section structure of the obtained BI-type multi-mode optical fiber.

In the GI-type preform 100 and the BI-type preform 200 having the structure described above, the intended GI-type multi-mode optical fiber 500A and the BI-type multi-mode optical fiber 500B can be obtained by one end thereof being drawn with the drawing apparatus 300 shown in FIG. 3A. Note that the drawing apparatus 300 shown in FIG. 3A includes at least a heater 301 for heating one end of the set GI-type preform 100 or BI-type preform 200, and a winding drum 302 for winding the heated one end of the preform 100 (200) while adding predetermined tension thereto. While the winding drum 302 rotates in a direction shown with an arrow R in FIG. 3A, the outer diameter of the cladding and the core is adjusted by adjusting the rotating speed. Moreover, by adjusting the heating temperature by the heater 301, the tension that is added to the heated one end of the preform 100 (200) is adjusted.

Figure 4:
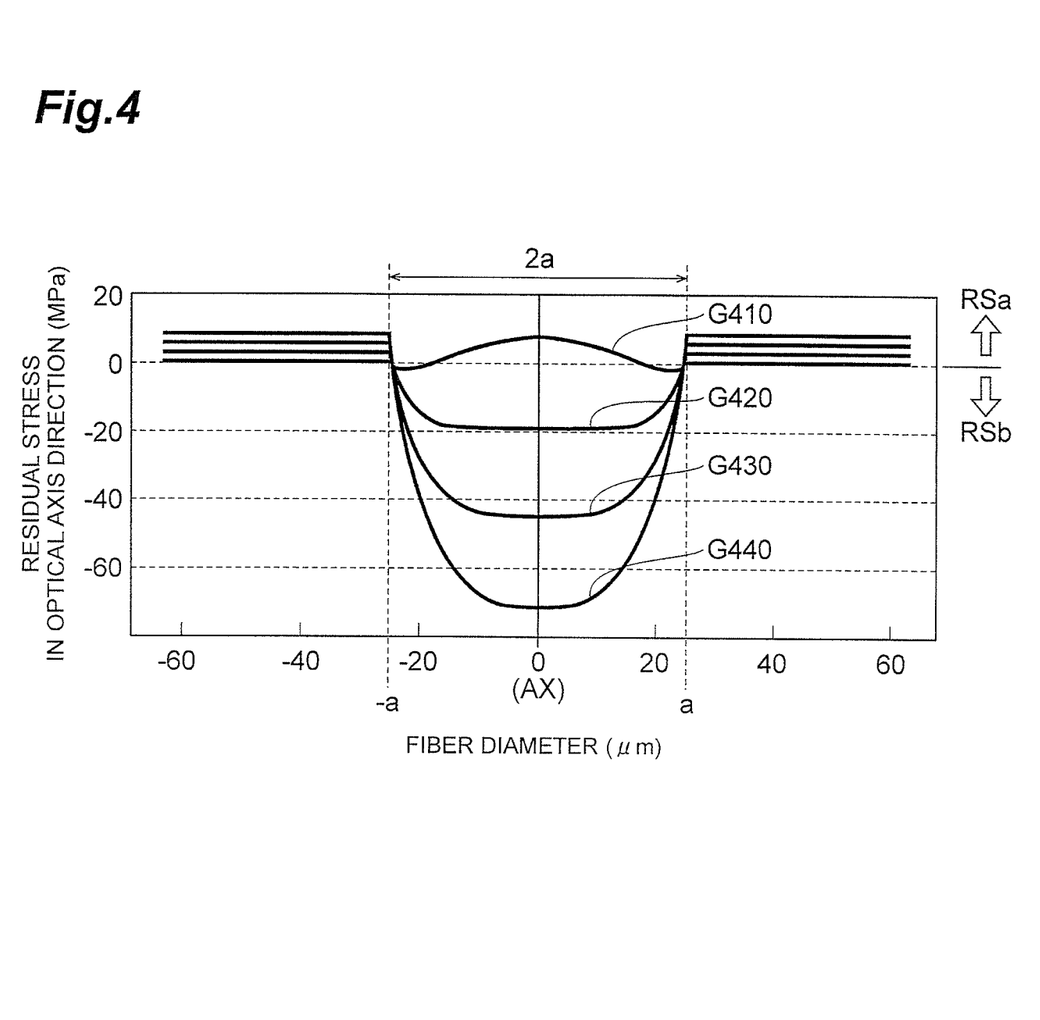
FIG. 4 is a graph showing the dependency of the residual stress in the core relative to the drawing tension with respect to the GI-type multi-mode optical fiber (FIG. 3B) manufactured based on various drawing tensions.

FIG. 4 is a graph showing the dependency of the residual stress in the core relative to the drawing tension with respect to the GI-type multi-mode optical fiber (FIG. 3B) manufactured based on various drawing tensions. Note that, in FIG. 4, the vertical axis represents the residual stress (MPa) in the core 510A and the cladding 520A in the optical axis direction, and the horizontal axis represents the fiber diameter (μm) of the GI-type multi-mode optical fiber 500A in which the coordinates with the intersection with the optical axis AX are the origin.

Note that, in FIG. 4, the range of the positive residual stress (region shown with an arrow RSa in the view) shows the region where tensile stress remains in the core 510A as residual stress. Meanwhile, the range of the negative residual stress (region shown with an arrow RSb in the view) shows the region where compressive stress remains in the core 510A as residual stress. Moreover, in FIG. 4, a graph G410 represents the residual stress of the GI-type multi-mode optical fiber 500A obtained by drawing the GI-type preform 100 at a drawing tension of 50 g using the drawing apparatus 300 shown in FIG. 3A, a graph G420 represents the residual stress of the GI-type multi-mode optical fiber 500A obtained by drawing the GI-type preform 100 at a drawing tension of 100 g using the drawing apparatus 300 shown in FIG. 3A, a graph G430 represents the residual stress of the GI-type multi-mode optical fiber 500A obtained by drawing the GI-type preform 100 at a drawing tension of 150 g using the drawing apparatus 300 shown in FIG. 3A, and a graph G440 represents the residual stress of the GI-type multi-mode optical fiber 500A obtained by drawing the GI-type preform 100 at a drawing tension of 200 g using the drawing apparatus 300 shown in FIG. 3A, respectively. Note that the drawing tension represents the tension of the glass part of the optical fiber in the linear velocity of production.

As described above, the stress (residual stress in the optical axis direction) generated in the core 510A of the obtained GI-type multi-mode optical fiber 500A will fluctuate due to the drawing tension, and also due to other drawing conditions, furnace structure of the drawing machine, and other factors. This fact is also clearly suggested in the results shown in FIG. 4. In other words, the fact that the stress generated in the core 510A can be controlled by adjusting the parameters was confirmed by adjusting the residual stress of the manufactured GI-type multi-mode optical fiber. Note that it should be easy to infer that the foregoing observation will similarly apply to a BI-type multi-mode optical fiber 500B as well.

Figure 5:
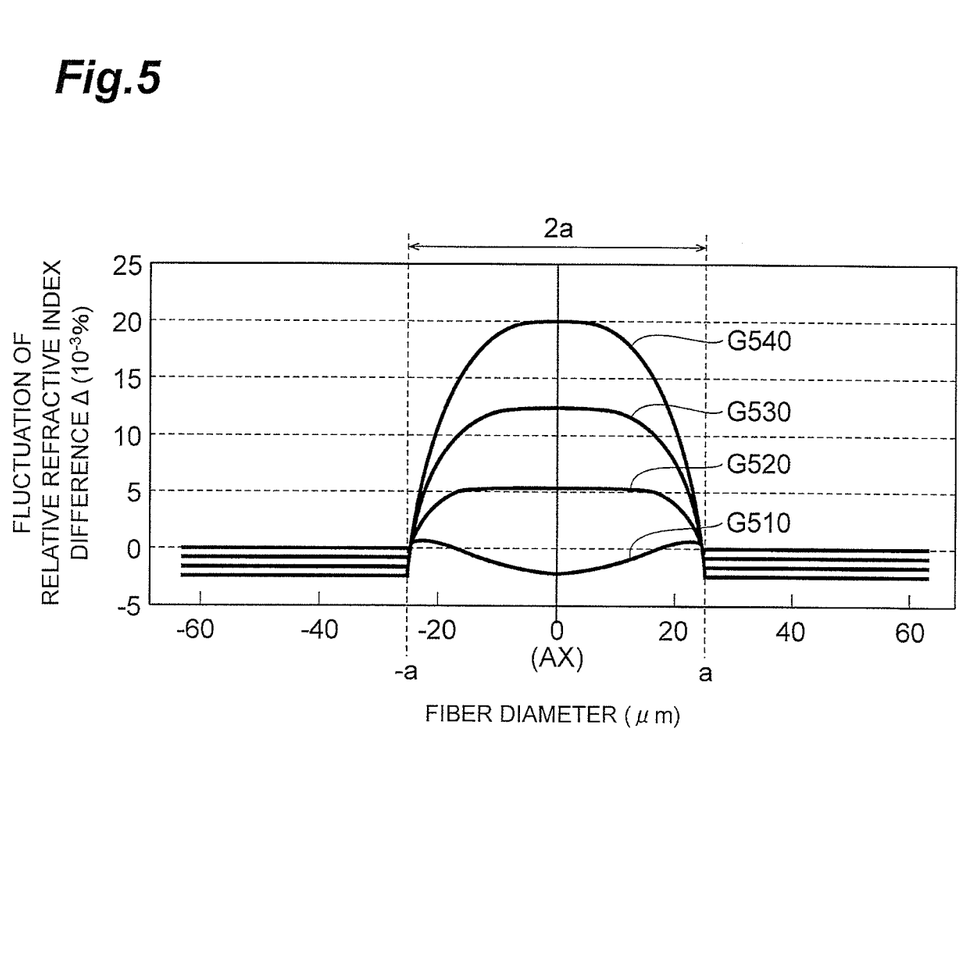
FIG. 5 is a view showing the fluctuation of the relative refractive index difference of the core caused by the photo-elastic effect (fluctuation of the refractive index profile caused by residual stress), relating to the GI-type multi-mode optical fiber (FIG. 3B) manufactured based on various drawing tensions.

FIG. 5 is a view showing the fluctuation of the relative refractive index difference of the core caused by the photoelastic effect (fluctuation of the refractive index profile caused by residual stress), relating to the GI-type multi-mode optical fibers (FIGS. 1A and 1B) manufactured based on various drawing tensions. Note that, in FIG. 5, the vertical axis represents the fluctuation ($10^{-3}$%) of the relative refractive index difference Δ, and the horizontal axis represents the fiber diameter (μm) of the GI-type multi-mode optical fiber 500A in which the coordinates with the intersection with the optical axis AX are the origin. Here, the fluctuation of the relative refractive index difference Δ is the result of converting the residual stress generated in the core 510A of the GI-type multi-mode optical fiber 500A, which is obtained by drawing the preform based on the various drawing tensions (50 to 200 g) shown in FIG. 2, into the fluctuation of the refractive index profile caused by the photoelastic effect.

Moreover, in FIG. 5, a graph G510 represents the relative refractive index difference fluctuation of the GI-type multi-mode optical fiber 500A obtained by drawing the GI-type preform 100 at a drawing tension of 50 g using the drawing apparatus 300 shown in FIG. 3A, a graph G520 represents the relative refractive index difference fluctuation of the GI-type multi-mode optical fiber 500A obtained by drawing the GI-type preform 100 at a drawing tension of 100 g using the drawing apparatus 300 shown in FIG. 3A, a graph G530 represents the relative refractive index difference fluctuation of the GI-type multi-mode optical fiber 500A obtained by drawing the GI-type preform 100 at a drawing tension of 150 g using the drawing apparatus 300 shown in FIG. 3A, and a graph G540 represents the relative refractive index difference fluctuation of the GI-type multi-mode optical fiber 500A obtained by drawing the GI-type preform 100 at a drawing tension of 200 g using the drawing apparatus 300 shown in FIG. 3A, respectively.

As can be seen from FIG. 5, the refractive index profile of the obtained GI-type multi-mode optical fiber 500A is subject to fluctuation due to the residual stress generated in the core 510A due to the drawing process. For example, the GI-type multi-mode optical fiber 500A obtained by drawing the preform at a drawing tension of 200 g was subject to a relative refractive index difference fluctuation of 0.02% at maximum.

Note that, as can be seen from FIG. 4, the values where the absolute value of the residual stress in the core 510A of the GI-type multi-mode optical fiber 500A manufactured based on the various drawing tensions (50 to 200 g) become maximum were as follows; namely, +7.4 MPa (tensile tension) at a drawing tension of 50 g (graph G410), −18.9 MPa (compressive tension) at a drawing tension of 100 g (graph G420), −44.0 MPa (compressive tension) at a drawing tension of 150 g (graph G430), and −69.8 MPa (compressive tension) at a drawing tension of 200 g (graph G440).

Figure 6:
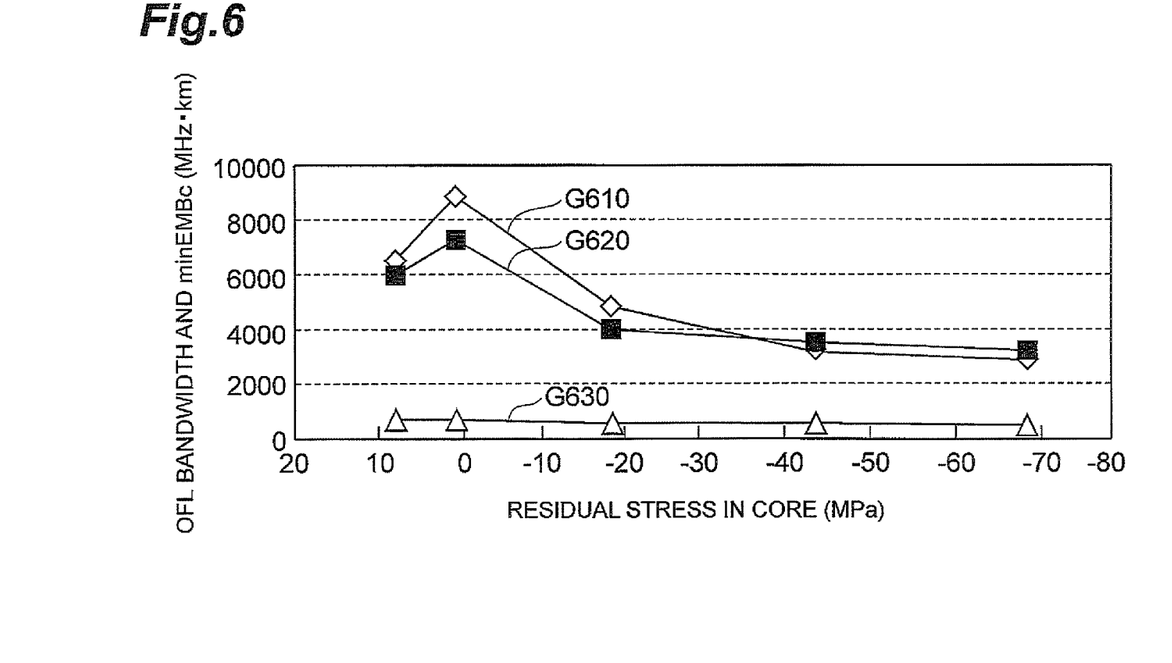
FIG. 6 is a graph showing the relationship of the residual stress (maximum absolute value) in the core and the transmission characteristics of the GI-type multi-mode optical fiber (FIG. 3B)

In addition to the foregoing results, the correlation of the transmission characteristics of the GI-type multi-mode fiber 500A and the residual stress where the absolute value becomes maximum in the core 510A is the correlation shown in FIG. 6.

Figure 7:
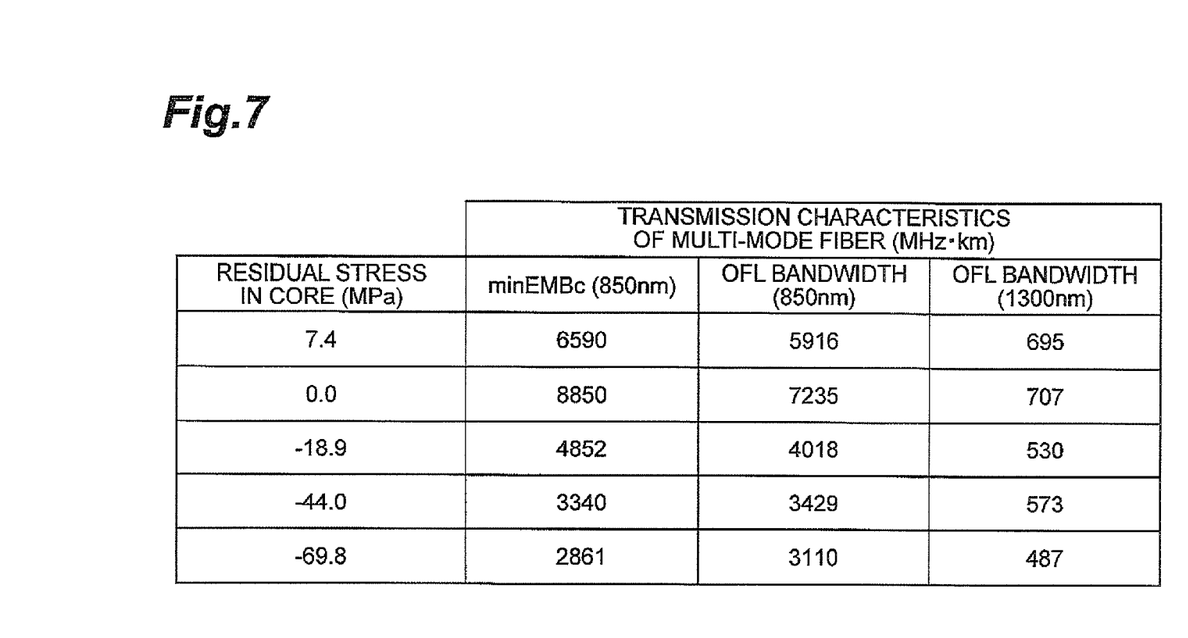
FIG. 7 is a table which summarizes the numerical values of the graph shown in FIG. 6.

FIG. 6 is a graph showing the relation of the residual stress (maximum absolute value) in the core and the transmission characteristics of the GI-type multi-mode optical fiber (FIGS. 1A and 1B). Moreover, FIG. 7 is a table which summarizes the numerical values of the graph shown in FIG. 6. Note that, in FIG. 6, a graph G610 represents the relation of the minEMBc (850 nm) and the residual stress in the core, a graph G620 represents the relation of the OFL bandwidth (850 nm) and the residual stress in the core, and a graph G630 represents the relation of the OFL bandwidth (1300 nm) and the residual stress in the core, respectively.

As can be seen from FIGS. 6 and 7, the respective transmission characteristics become maximum when the residual stress is 0 (when the refractive index profile of the GI-type preform 100 and the refractive index profile of the obtained GI-type multi-mode optical fiber 500A coincide). Meanwhile, when residual stress is generated in the core 510A, fluctuation of the refractive index profile caused by the photoelastic effect occurs regardless of whether the foregoing residual stress is compressive stress or tensile stress, and the transmission characteristics of the GI-type multi-mode optical fiber 500A obtained by drawing will deteriorate. Consequently, it was confirmed that the residual stress generated in the core 510A based on the drawing process caused production yield to considerably deteriorate for a GI-type multi-mode fiber 500A in which the transmission characteristics change significantly even based on a slight fluctuation of the refractive index profile. Note that it should be easy to infer that the foregoing observation will similarly apply to a BI-type multi-mode optical fiber 500B as well.

Here, referring once again to the OM3 standard of ISO/IEC11801, in the OM3 standard, the multi-mode optical fiber needs to satisfy the foregoing three conditions (OM3-1 to OM3-3). Moreover, in the OM4 standard, the multi-mode optical fiber needs to satisfy the foregoing three conditions (OM4-1 to OM4-3).

Even though an extremely high minEMBc (850 nm) of 8850 MHz can be expected in the refractive index profile (before drawing) of the preform, when residual stress of roughly 20 Mpa is generated in the core of the obtained multi-mode optical fiber (after drawing), there is a possibility that the multi-mode optical fiber will fall below the condition (minEMBc≥4700 MHz·km) of the OM4 standard. Moreover, the preform itself is subject to process variation, and a considerable number of preforms in which the predicted characteristics thereof are lower than the conditions of the OM3 standard and/or OM4. In addition, in the case of a GI-type multi-mode optical fiber (refer to FIG. 6 and FIG. 7) in which the residual stress in the core 510A is 69.8 MPa, the OFL bandwidth (1300 nm) falls below both the OM3 standard and the OM4 standard. Consequently, it can be understood that, for both a GI-type and a BI-type, it is difficult to manufacture a multi-mode optical fiber which satisfies the OM3 standard unless the optical fiber is manufactured by inhibiting the residual stress in the core to be, at maximum, 50 MPa or less.

As described above, the most important transmission characteristics in both the GI-type and the BI-type multi-mode optical fibers are the OFL bandwidth (850 nm) in a wavelength of 850 nm, the OFL bandwidth (1300 nm) in a wavelength of 1300 nm, and the minEMBc (850 nm) in a wavelength of 850 nm. Since these characteristics change keenly to even a slight fluctuation of the refractive index profile, the optical fiber needs to be manufactured while strictly controlling the refractive index profile of the obtained multi-mode optical fiber in order to ensure high-speed transmission.

Generally speaking, in a multi-mode optical fiber (both GI-type and BI-type) mainly composed of silica glass, an additive element ($GeO_2$) for controlling the refractive index is added, in a large amount, into the core, and the core diameter thereof is also large. Thus, the glass viscosity coefficient of the core differs considerably from the glass viscosity coefficient of the cladding and the trench portion, and great residual stress may remain at the center part of the core depending on the conditions of the drawing process.

Thus, in the present invention, both the GI-type and the BI-type multi-mode optical fibers are manufactured by drawing a preform so that the residual stress (compressive stress or tensile stress in the optical axis direction) generated in the core becomes 50 MPa or less by controlling drawing apparatus configuration or the drawing conditions. It is thereby possible to minimize changes in the refractive index profile of a multi-mode optical fiber caused by the residual stress generated in the core during the drawing process, and effectively prevent the deterioration in the transmission characteristics of the multi-mode optical fiber caused by the drawing process.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-mode optical fiber, comprising:
   a core extending along an optical axis direction and doped with $GeO_2$; and
   a cladding provided to an outer periphery of the core and having a refractive index lower than that of the core,
   wherein, in a refractive index profile in a diametric direction of the multi-mode optical fiber, an α value of a portion corresponding to the core is 1.9 to 2.2, a maximum relative refractive index difference Δ of the core with respect to a reference region of the cladding is 0.8 to 2.4%, and a diameter 2a of the core is 47.5 to 52.5 μm or 60 to 65 μm,
   wherein both maximum tensile stress and maximum compressive stress in the optical axis direction remaining in the core are 50 MPa or less, and
   wherein, in a residual stress distribution of the core, residual stress in a central region including the optical axis is one of the tensile stress and the compressive stress, and residual stress in a peripheral region surrounding the central region is the other of the tensile stress and the compressive stress.

2. The multi-mode optical fiber according to claim 1, wherein both the maximum tensile stress and the maximum compressive stress are 30 MPa or less.

3. A multi-mode optical fiber comprising:
   a core extending along an optical axis direction and doped with $GeO_2$; and
   a cladding provided to an outer periphery of the core and having a refractive index lower than that of the core,
   wherein, in a refractive index profile in a diametric direction of the multi-mode optical fiber, an α value of a portion corresponding to the core is 1.9 to 2.2, a maximum relative refractive index difference Δ of the core with respect to a reference region of the cladding is 0.8 to 2.4%, and a diameter 2a of the core is 47.5 to 52.5 μm or 60 to 65 μm,
   wherein both the maximum tensile stress and the maximum compressive stress in the optical axis direction remaining in the core are 20 MPa or less, and
   wherein, in a residual stress distribution of the core, residual stress in a central region including the optical axis is one of the tensile stress and the compressive stress, and residual stress in a peripheral region surrounding the central region is the other of the tensile stress and the compressive stress.

4. The multi-mode optical fiber according to claim 3, further comprising a trench portion provided between the core and the cladding, the trench portion having a refractive index lower than that of the cladding.

5. The multi-mode optical fiber according to claim 3, satisfying following conditions:

minEMBc(850 nm)≥4700 MHz·km;

OFL bandwidth(850 nm)≥3500 MHz·km; and

OFL bandwidth(1300 nm)≥500 MHz·km, where the minEMBc (850 nm) is a minimum value of calculated effective modal bandwidth at 850 nm, the OFL bandwidth (850 nm) is a bandwidth of overfilled launch at 850 nm, and the OFL bandwidth (1300 nm) is a bandwidth of overfilled launch at 1300 nm.

6. The multi-mode optical fiber according to claim 3, satisfying following conditions:

minEMBc(850 nm)≥2000 MHz·km;

OFL bandwidth(850 nm)≥1500 MHz·km; and

OFL bandwidth(1300 nm)≥500 MHz·km, where the minEMBc (850 nm) is a minimum value of calculated effective modal bandwidth at 850 nm, the OFL bandwidth (850 nm) is a bandwidth of overfilled launch at 850 nm, and the OFL bandwidth (1300 nm) is a bandwidth of overfilled launch at 1300 nm.

7. A multi-mode optical fiber, comprising:
a core extending along an optical axis direction and doped with $GeO_2$;
a cladding provided to an outer periphery of the core and having a refractive index lower than that of the core; and
a trench portion provided between the core and the cladding, the trench portion having a refractive index lower than that of the cladding,
wherein, in a refractive index profile in a diametric direction of the multi-mode optical fiber, an α value of a portion corresponding to the core is 1.9 to 2.2, a maximum relative refractive index difference Δ of the core with respect to a reference region of the cladding is 0.8 to 2.4%, and a diameter 2*a* of the core is 47.5 to 52.5 μm or 60 to 65 μm,
wherein both maximum tensile stress and maximum compressive stress in the optical axis direction remaining in the core are 50 MPa or less, and
wherein, in a residual stress distribution of the core, residual stress in a central region including the optical axis is one of the tensile stress and the compressive stress, and residual stress in a peripheral region surrounding the central region is the other of the tensile stress and the compressive stress.

8. The multi-mode optical fiber according to claim 7, wherein both the maximum tensile stress and the maximum compressive stress are 30 MPa or less.

9. The multi-mode optical fiber according to claim 8, wherein both the maximum tensile stress and the maximum compressive stress are 20 MPa or less.

10. The multi-mode optical fiber according to claim 7, satisfying following conditions:

minEMBc(850 nm)≥4700 MHz·km;

OFL bandwidth(850 nm)≥3500 MHz·km; and

OFL bandwidth(1300 nm)≥500 MHz·km, where the minEMBc (850 nm) is a minimum value of calculated effective modal bandwidth at 850 nm, the OFL bandwidth (850 nm) is a bandwidth of overfilled launch at 850 nm, and the OFL bandwidth (1300 nm) is a bandwidth of overfilled launch at 1300 nm.

11. The multi-mode optical fiber according to claim 7, satisfying following conditions:

minEMBc(850 nm)≥2000 MHz·km;

OFL bandwidth(850 nm)≥1500 MHz·km; and

OFL bandwidth(1300 nm)≥500 MHz·km, where the minEMBc (850 nm) is a minimum value of calculated effective modal bandwidth at 850 nm, the OFL bandwidth (850 nm) is a bandwidth of overfilled launch at 850 nm, and the OFL bandwidth (1300 nm) is a bandwidth of overfilled launch at 1300 nm.

* * * * *